(12) United States Patent
Takahashi

(10) Patent No.: US 12,273,371 B2
(45) Date of Patent: Apr. 8, 2025

(54) ATTACK REPRODUCTION SUPPORT APPARATUS, ATTACK REPRODUCTION SUPPORT METHOD, AND COMPUTER READABLE RECORDING MEDIUM

(71) Applicant: NEC Corporation, Tokyo (JP)

(72) Inventor: Yusuke Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 17/922,486

(22) PCT Filed: May 12, 2020

(86) PCT No.: PCT/JP2020/019025
§ 371 (c)(1),
(2) Date: Oct. 31, 2022

(87) PCT Pub. No.: WO2021/229696
PCT Pub. Date: Nov. 18, 2021

(65) Prior Publication Data
US 2023/0179624 A1   Jun. 8, 2023

(51) Int. Cl.
*H04L 9/40* (2022.01)
*G06F 21/55* (2013.01)
*G06F 21/57* (2013.01)

(52) U.S. Cl.
CPC ...... *H04L 63/1441* (2013.01); *H04L 63/1425* (2013.01)

(58) Field of Classification Search
CPC . H04L 63/1441; H04L 63/1425; G06F 21/55; G06F 21/57
See application file for complete search history.

(56) References Cited

U.S. PATENT DOCUMENTS

| | | | |
|---|---|---|---|
| 2021/0342451 A1* | 11/2021 | Okada | G06F 21/44 |
| 2021/0406362 A1* | 12/2021 | Zhong | G06F 21/554 |

FOREIGN PATENT DOCUMENTS

| | | | |
|---|---|---|---|
| JP | 2017-224053 | * | 12/2017 |
| JP | 2017-224053 A | | 12/2017 |
| JP | 6552135 B1 | | 10/2019 |

OTHER PUBLICATIONS

English translation of Written opinion for PCT Application No. PCT/JP2020/019025, mailed on Sep. 1, 2020.
International Search Report for PCT Application No. PCT/JP2020/019025, mailed on Sep. 1, 2020.
(Continued)

*Primary Examiner* — Vu V Tran

(57) ABSTRACT

An attack reproduction support apparatus includes: a setting unit configured to set a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and a responding unit configured to, upon receiving a request for transmitting the attack information from the attack reproduction apparatus, transmitting the attack information to the attack reproduction apparatus based on the sequence information, in order to respond to the request.

13 Claims, 8 Drawing Sheets

(56) References Cited

OTHER PUBLICATIONS

Yu Tsuda et al., "Implementation of an Interface to Define Attacking Scenarios for Reproducing Targeted Attacks", Computer Security Symposium 2014, Digest of Technical Papers, vol. 2014, No. 2, pp. 450-457, Oct. 2014.

Yu Tsuda et al., "Implementation of an Environment for Reproducing Targeted Attacks", IEICE Technical Report, May 15, 2014, vol. 114, No. 43, pp. 83-88.

* cited by examiner

Fig. 3

| IDENTIFICATION INFORMATION | SEQUENCE INFORMATION | ATTACK INFORMATION | TIMING INFORMATION |
|---|---|---|---|
| scenario 1 | 1 | attck 1 | 10[s] |
| | 2 | attck 2 | 60[s] |
| | ⋮ | ⋮ | ⋮ |
| | n | attck n | — |

ATTACK REPRODUCTION SUPPORT APPARATUS, ATTACK REPRODUCTION SUPPORT METHOD, AND COMPUTER READABLE RECORDING MEDIUM

This application is a National Stage Entry of PCT/JP2020/019025 filed on May 12, 2020, the contents of all of which are incorporated herein by reference, in their entirety.

TECHNICAL FIELD

The invention relates to an attack reproduction support apparatus and an attack reproduction support method with which a targeted attack is reproduced, and further relates to a computer readable recording medium having recorded thereon a program for realizing the apparatus and method. Also, the invention relates to a system including the attack reproduction support apparatus and an attack reproduction apparatus.

BACKGROUND ART

Targeted attacks that are cyber-attacks targeting specific organizations have become social problems. As countermeasures for targeted attacks, a method for reproducing, in a pseudo manner, the attack procedure of a targeted attack is known in order to accurately understand the attack traces.

As related techniques, a technique for reproducing a targeted attack is disclosed in Non-Patent Document 1. In Non-Patent Document 1, a method is disclosed for understanding an attack trace by reproducing the attack procedure of a targeted attack using a batch file in which the attack scenario is described.

LIST OF RELATED ART DOCUMENTS

Non-Patent Document

Non-Patent Document 1: Yu Tsuda et al., "Implementation of an Interface to Define Attacking Scenarios for Reproducing Targeted Attacks", Computer Security Symposium 2014, Digest of Technical Papers, vol. 2014, no. 2, pp. 450-457, October 2014.

SUMMARY

Technical Problems

However, with the technique disclosed in Non-Patent Document 1, the targeted attack cannot be realistically reproduced. That is, in the technique disclosed in Non-Patent Document 1, a batch file in which a scenario is described is executed, and therefore, communication with a server that occurs in an actual targeted attack and an attack by an attacker at any timing cannot be reproduced.

An example object, as one aspect, is to provide an attack reproduction support apparatus, an attack reproduction support method, a computer readable recording medium, and a system including the attack reproduction support apparatus and an attack reproduction apparatus, with which a targeted attack is realistically reproduced.

Solution to the Problems

In order to achieve the example object described above, an attack reproduction support apparatus according to an example aspect includes:

a setting unit configured to set a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and a responding configured to, upon receiving a request for transmitting the attack information from the attack reproduction apparatus, transmitting the attack information to the attack reproduction apparatus based on the sequence information, in order to respond to the request.

Also, in order to achieve the example object described above, an attack reproduction support method according to an example aspect includes:

setting a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and transmitting, upon receiving a request for transmitting the attack information from the attack reproduction apparatus, the attack information to the attack reproduction apparatus based on the sequence information, in order to respond to the request.

Also, in order to achieve the example object described above, a computer-readable recording medium according to an example aspect includes a program recorded on the computer-readable recording medium, the program including instructions that cause the computer to carry out:

setting a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and transmitting, upon receiving a request for transmitting the attack information from the attack reproduction apparatus, the attack information to the attack reproduction apparatus based on the sequence information, in order to respond to the request.

Furthermore, in order to achieve the example object described above, a system including an attack reproduction support apparatus and an attack reproduction apparatus according to an example aspect includes:

wherein the attack reproduction support apparatus includes:

a setting unit configured to set a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and a responding unit configured to, upon receiving a request for transmitting the attack information from the attack reproduction apparatus, transmitting the attack information to the attack reproduction apparatus based on the sequence information, in order to respond to the request, and the attack reproduction apparatus includes:

a reproducing unit configured to reproduce a targeted attack based on the attack information in response to the request transmitted to the attack reproduction support apparatus; and a transmitting unit configured to transmit history information generated when a targeted attack has been reproduced to the attack reproduction apparatus.

Advantageous Effects of the Invention an example aspect, it is possible to realistically reproduced a targeted attack.

BRIEF DESCRIPTION OF THE DRAWINGS

FIG. 3 is a diagram for describing an example of the reproduction information.

EXAMPLE EMBODIMENT

Figure 1:
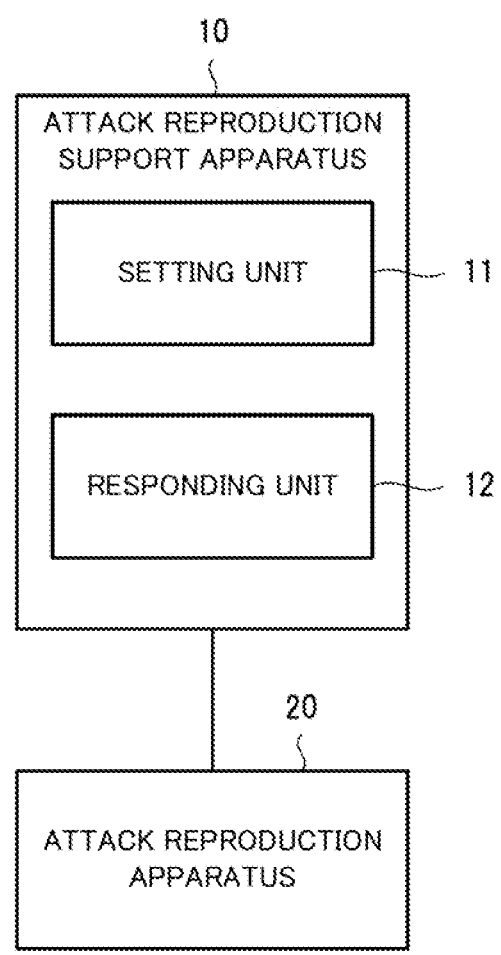
FIG. 1 is a diagram for describing an example of an attack reproduction support apparatus.

First, an outline will be described for facilitating understanding of the example embodiments described below:

In the following example embodiments, a case will be described where a scenario of a targeted attack is executed in a simulation system, in order to understand the attacker actions in the targeted attack, and the attack traces remained in an organization that is the target of the targeted attack. The scenario is information indicating the attack procedure of executing an attack.

The simulation system is a system in which the environment for reproducing an attack is simulated. The simulation system includes systems that simulate a system (victim environment) of an organization that is the attack target, and a system (attacker environment) of an attacker that performs an attack. Note that the simulation system may realize the environment for reproducing an attack using a virtual machine, a virtual network, and the like.

Next, the attacker, when performing a targeted attack, advances the attack while setting milestones for achieving a final objective, selecting tools for achieving the milestones, and acquiring information regarding the organization that is the target.

The actions of the attacker is classified into reconnaissance, weaponization, delivery, exploitation, installation, command & control (C&C), and actions on objectives, which are typified by the cyber kill chain.

In the delivery, a mail to which malware is attached, a mail with a malicious link, or the like is sent into the victim environment. For example, the attacker sends a mail to a terminal in the victim environment. Alternatively, the attacker accesses a terminal in the victim environment.

In the exploitation, an attack file of the malware is caused to be executed. Alternatively, a malicious link is caused to be accessed, and the attack is caused to be executed by making bad use of vulnerability.

In the installation, the execution of the malware is enabled by causing the exploitation to be successful and causing the target in the victim environment to be infected with the malware.

In the C&C, the malware in the victim environment communicates with a C&C server in the attacker environment for enabling remote operations of the target.

In the actions on objectives, the objective of the attacker is executed such as information exploitation, information falsification, data corruption, service outage, or the like.

However, in the simulation system described in Non-Patent Document 1, an attack is executed using a batch file in which a scenario is described, and therefore, the C&C communication that occurs in an actual targeted attack cannot be realistically reproduced.

Also, an actual attack is executed by an attacker at any timing. However, with the method in which commands described in a batch file in advance are executed, as described in Non-Patent Document 1, the attack timing cannot be easily changed, and therefore it is difficult to control the attack timing.

Also, with the method described in Non-Patent Document 1, the attack timing control is performed in the victim environment, and therefore the trace regarding timing control remains in a log in the victim environment, and this trace becomes noise.

Moreover, the method described in Non-Patent Document 1 does not include a function of acquiring a log generated in the victim environment.

Through such processes, the inventors have found a problem that, in the method described in Non-Patent Document 1, a targeted attack cannot be realistically reproduced, and have derived a means for solving the problem.

That is, the inventors have derived a means for reproducing a trace of the C&C communication that is generated in an actual targeted attack, and an attack by an attacker at any timing. As a result, a targeted attack can be realistically reproduced. Also, a function of acquiring an accurate log regarding a targeted attack is provided.

Hereinafter, the example embodiments will be described with reference to the drawings. Note that, in the drawings described below; the elements that have the same or corresponding functions are given the same reference numerals and description thereof may not be repeated.

First Example Embodiment

The configuration of an attack reproduction support apparatus 10 according to a first example embodiment will be described using FIG. 1. FIG. 1 is a diagram for describing an example of an attack reproduction support apparatus.

Apparatus Configuration

The attack reproduction support apparatus 10 is an apparatus for supporting an attack reproduction apparatus 20 to realistically reproduce a targeted attack. The attack reproduction apparatus 20 is an apparatus that simulates a victim environment.

The attack reproduction support apparatus 10 is an information processing apparatus such as a server computer or a personal computer on which a programmable device such as a CPU (Central Processing Unit) or an FPGA (Field-Programmable Gate Array) or both of the programmable devices are mounted, for example. Also, as shown in FIG. 1, the attack reproduction support apparatus 10 includes a setting unit 11 and a responding unit 12.

The setting unit 11 sets a plurality of pieces of attack information for the attack reproduction apparatus 20 that reproduces a targeted attack to reproduce the targeted attack, and sequence information that indicates the sequence of transmitting the plurality of pieces of attack information to the attack reproduction apparatus 20. Also, the setting unit 11 sets timing information indicating timings at which the plurality of pieces of attack information are transmitted to the attack reproduction apparatus 20.

Upon receiving a request for transmitting attack information from the attack reproduction apparatus 20, the responding unit 12, in response to the request, transmits the attack information to the attack reproduction apparatus 20 based on the sequence information.

As described above, in the first example embodiment, a trace of the C&C communication that is generated in an actual targeted attack, and an attack by an attacker at any timing can be reproduced, and therefore a targeted attack can be realistically reproduced. As a result, an accurate log regarding a targeted attack can be acquired.

System Configuration

Figure 2:
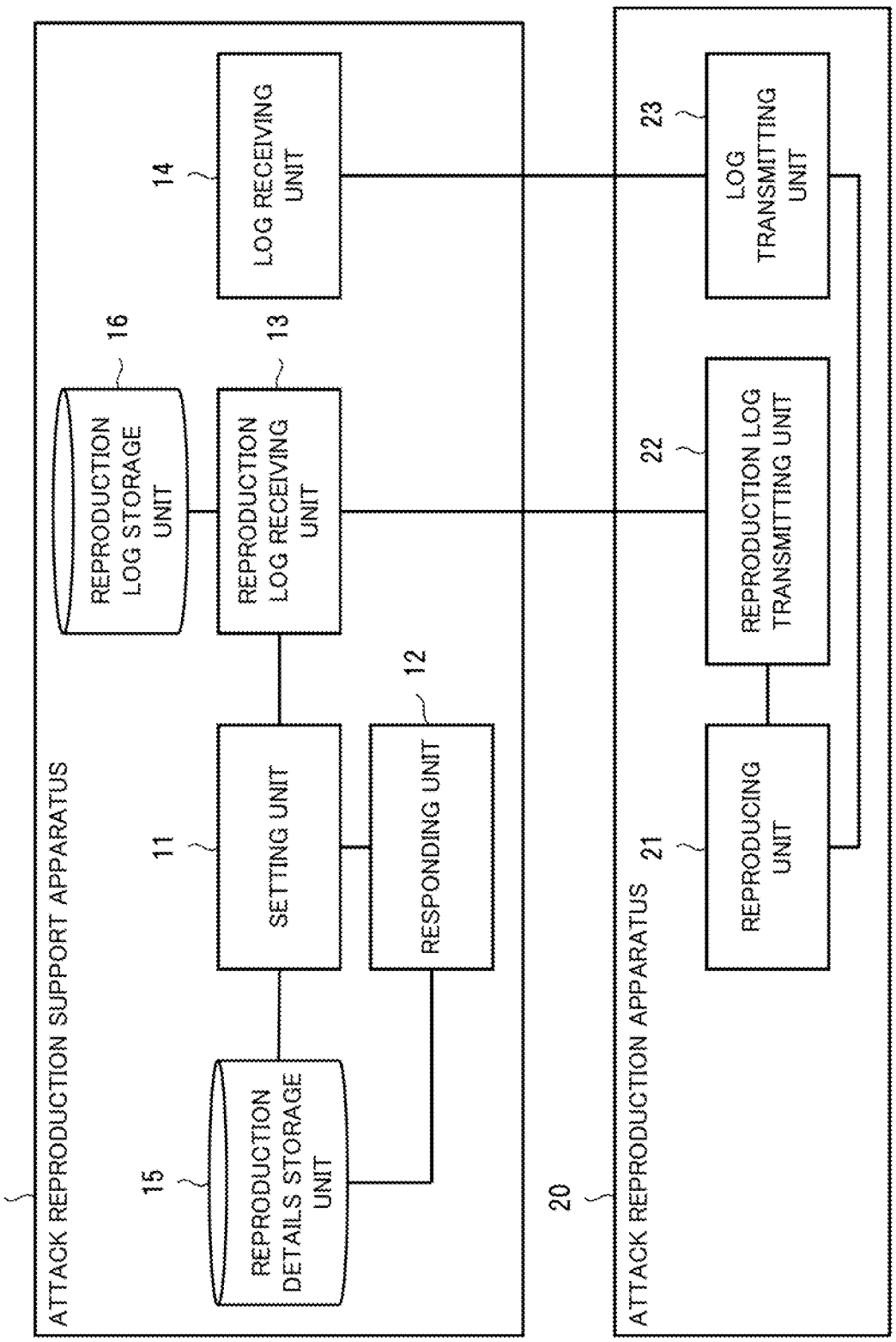
FIG. 2 is a diagram illustrating an example of a system including the attack reproduction support apparatus.

The configuration of the attack reproduction support apparatus 10 in the first example embodiment will be more specifically described using FIG. 2. FIG. 2 is a diagram illustrating an example of a system including the attack reproduction support apparatus.

As shown in FIG. 2, in the first example embodiment, a system 100 (simulation system) that reproduces attacks includes the attack reproduction support apparatus 10 and the attack reproduction apparatus 20.

The attack reproduction support apparatus 10 includes the setting unit 11, the responding unit 12, a reproduction log receiving unit 13, a log receiving unit 14, a reproduction details storage unit 15, and a reproduction log storage unit 16.

The attack reproduction apparatus 20 includes a reproducing unit 21, a reproduction log transmitting unit 22, and a log transmitting unit 23.

The attack reproduction support apparatus will be described.

The setting unit 11 stores reproduction information in which identification information, sequence information, attack information, and timing information are associated, in the reproduction details storage unit 15. Moreover, the setting unit 11 has a function of editing the reproduction information using a user interface.

Specifically; first, the setting unit 11 acquires reproduction information input by a user. Next, the user edits the acquired reproduction information using a user interface included in the setting unit 11. For example, the user performs edition such as modification of parameters of commands included in attack information and addition of timing information. Next, the setting unit 11 stores the reproduction information that has been edited in the reproduction details storage unit 15. Note that the edition of reproduction information may not be performed.

The reproduction information is a file in which a scenario (reproduction details) of reproducing an attack is described, for example. The reproduction information is information as shown in FIG. 3, for example. FIG. 3 is a diagram for describing an example of the reproduction information.

"Scenario 1" shown in FIG. 3 is identification information for identifying the reproduction information. The example in FIG. 3 is an example in which one scenario is stored, but a plurality of scenarios may also be stored.

"1", "2" ... "n" shown in FIG. 3 are sequence information for indicating the sequence of executing pieces of attack information. Note that the sequence information need only be information indicating the sequence of transmitting the pieces of attack information to the attack reproduction apparatus 20.

"Attck 1", "attck 2", ... "attck n" shown in FIG. 3 indicate pieces of attack information for activating attack tools and commands, for example. For example, when an attack to an OS (Operating System) of a terminal A provided in the victim environment is reproduced, the attack information includes information indicating the IP address of the terminal A and information to be used to attack the OS. "dir C: YWindows" or the like is conceivable as one of the information to be used to attack the terminal A.

"10 [s]", "60 [s]" ... shown in FIG. 3 are pieces of timing information indicating the timings at which the pieces of attack information are respectively transmitted to the attack reproduction apparatus 20. The first and second lines in FIG. 3 indicate that upon receiving a request after transmitting the attack information "attck 1" to the attack reproduction apparatus 20, the responding unit 12 transmits the attack information "attck 2" at a point in time at which 10 seconds has elapsed. Note that the date and time at which attack information is to be transmitted may also be designated in the timing information.

Note that the reproduction details storage unit 15 is provided inside the attack reproduction support apparatus 10 in the example in FIG. 2, but may be provided outside the attack reproduction support apparatus 10.

Upon receiving requests for transmitting attack information from the attack reproduction apparatus 20, the responding unit 12 transmits pieces of attack information to the attack reproduction apparatus 20 according to the sequence indicated by the sequence information.

Specifically; first, the responding unit 12 receives a request from the attack reproduction apparatus 20. Next, upon receiving the request, the responding unit 12 selects attack information that has not been transmitted at this point in time and is to be transmitted next, based on the sequence information. Next, the responding unit 12 transmits the selected attack information to the attack reproduction apparatus 20.

Also, the responding unit 12 transmits the selected attack information to the attack reproduction apparatus 20 based on the timing information. Even if the responding unit 12 has received a request from the attack reproduction apparatus 20 after transmitting attack information in response to the previous request, if the current point in time is not the timing indicated by the timing information, the responding unit 12 does not transmit the selected attack information to the attack reproduction apparatus 20.

Also, if the responding unit 12 has transmitted all the pieces of attack information to the attack reproduction apparatus 20, the responding unit 12 may transmit end information indicating that the reproduction has finished to the attack reproduction apparatus 20.

The reproduction log receiving unit 13 receives a reproduction log transmitted by the reproduction log transmitting unit 22 of the attack reproduction apparatus 20, and records the received reproduction log in the reproduction log storage unit 16. The reproduction log is a log that is generated when an attack has been executed on a victim environment based on the attack information.

The reproduction log is stored in the reproduction log storage unit 16 in association with identification information for identifying the scenario. The reproduction log includes information for identifying the attack information (e.g., sequence information), information indicating the start date and time and end date and time of the attack, information indicating the element that is targeted in the victim environment (e.g., server computer, terminal, OS (Operating System), software, or parameter), information indicating the details of the executed attack, and information indicating the result of executing the attack.

Note that the reproduction log can be represented in a JSON format, for example. "dir C:Windows" is conceivable as one of the information indicating the details of the executed attack. The information indicating the result of executing the attack is a character string indicating whether or not the attack has been normally executed.

If the attack has not been normally executed, a character string indicating an error is described. If the attack has been normally executed, a character string indicating that the attack has been normally executed is described. When the executed attack is "dir C: YWindows", if the attack has been normally executed, a character string indicating a file and a folder that are present under the Windows folder are described.

Note that the reproduction log storage unit 16 is provided inside the attack reproduction support apparatus 10 in the example in FIG. 2, but may also be provided outside the attack reproduction support apparatus 10. Moreover, the reproduction details storage unit 15 and the reproduction log storage unit 16 may also be provided in the same storage apparatus.

The log receiving unit 14 receives a log that is generated by an element in the victim environment and is transmitted by the log transmitting unit 23 of the attack reproduction apparatus 20, and stores the received log in a storage unit that is provided inside or outside the attack reproduction support apparatus 10. The log regarding the victim environment is an event log, for example.

The attack reproduction apparatus will be described.

The attack reproduction apparatus 20 is an information processing apparatus such as a server computer or a personal computer on which a programmable device such as a CPU or an FPGA or both of the programmable devices are mounted, for example.

The reproducing unit 21 executes an attack on a victim environment based on attack information. Also, the reproducing unit 21 generates a reproduction log and a log regarding the victim environment.

Specifically, first, the reproducing unit 21 transmits requests for causing the responding unit 12 to transmit attack information to the responding unit 12 at preset time intervals. Next, upon acquiring a response to a request, that is, attack information in response to the request, the reproducing unit 21 executes an attack on the victim environment based on the attack information.

The reproduction log transmitting unit 22 acquires a log regarding the attack executed on the victim environment, the log having been generated by the reproducing unit 21, and transmits the log to the reproduction log receiving unit 13.

The log transmitting unit 23 acquires the log regarding the victim environment that has been generated by the reproducing unit 21, and transmits the log to the log receiving unit 14. An existing data collection tool such as CDIR-C(Cyber Defense Institute Incident Response Collector) or CyLR (CyLR-Live Response Collection Tool) may be used to collect logs regarding victim environment, for example.

Apparatus Operations

Figure 4:
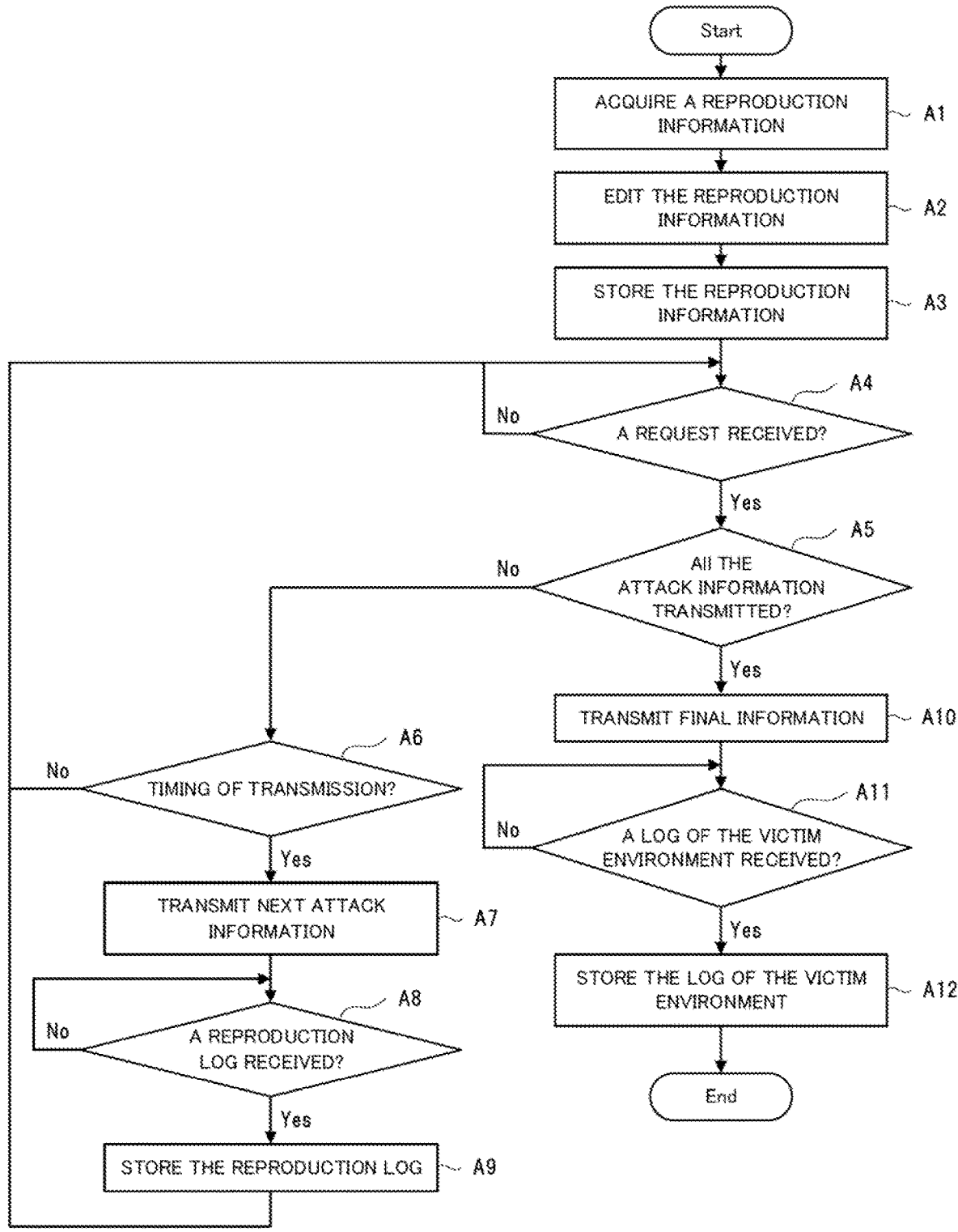
FIG. 4 is a diagram for describing an example of the operations of the attack reproduction support apparatus.

Next, the operations of the attack reproduction support apparatus 10 in the first example embodiment will be described using FIG. 4. FIG. 4 is a diagram for describing an example of the operations of the attack reproduction support apparatus. In the following description, the drawings will be referred to as appropriate. Furthermore, in the first example embodiment, the attack reproduction support method is carried out by causing the attack reproduction support apparatus to operate. Therefore, the following description of the operations of the attack reproduction support apparatus applies to the attack reproduction support method according to the first example embodiment.

As shown in FIG. 4, first the setting unit 11 acquires reproduction information input by a user (step A1). Next, the acquired reproduction information is edited using a user interface of the setting unit 11 (step A2). Note that the reproduction information need not be necessarily edited. Next, the setting unit 11 stores the reproduction information in the reproduction details storage unit 15 (step A3).

Next, the responding unit 12 determines whether or not a request has been received from the attack reproduction apparatus 20 (step A4). If a request has been received (step A4: Yes), the responding unit 12 determines whether or not all the pieces of attack information have been transmitted based on the sequence information (step A5). Note that the responding unit 12 waits until receiving a request (step A4: No). Note that if the responding unit 12 cannot receive a request even if waited for a predetermined period of time or more, the processing is ended.

If all the pieces of attack information have not been transmitted (step A5: No), the responding unit 12 refers to the timing information, and determines whether or not attack information can be transmitted at this point in time (step A6).

Even if a request is received from the attack reproduction apparatus 20 after transmitting attack information in response to the previous request, if the current point in time is not the timing indicated by the timing information (step A6: No), the responding unit 12 does not transmit attack information to the attack reproduction apparatus 20, and advances the processing to step A4.

If a request is received from the attack reproduction apparatus 20 after transmitting attack information in response to the previous request, and the current point in time is the timing indicated by the timing information (step A6: Yes), the responding unit 12 selects attack information that has not been transmitted at this point in time and is to be transmitted next, based on the sequence information. Next, the responding unit 12 transmits the selected attack information to the attack reproduction apparatus 20 (step A7).

Next, the reproduction log receiving unit 13 determines whether or not a reproduction log transmitted from the reproduction log transmitting unit 22 of the attack reproduction apparatus 20 has been received (step A8). If a reproduction log has been received (step A8: Yes), the reproduction log receiving unit 13 records the reproduction log in the reproduction log storage unit 16 (step A9). The reproduction log receiving unit 13 waits until a reproduction log is received (step A8: No). Note that if the reproduction log receiving unit 13 cannot receive a reproduction log even if waited for a predetermined period of time or more, the processing is ended.

If all the pieces of attack information has been transmitted (step A5: Yes), the responding unit 12 transmits final information indicating that all the pieces of attack information have been transmitted to the attack reproduction apparatus 20 (step A10).

Next, the log receiving unit 14 determines whether or not a log regarding the victim environment that was generated by an element in the victim environment has been received, the log being transmitted from the log transmitting unit 23 of the attack reproduction apparatus 20 (step A11). If a log regarding the victim environment has been received (step A11: Yes), the log receiving unit 14 stores the received log in a storage unit provided inside or outside the attack reproduction support apparatus 10 (step A12). The log receiving unit 14 waits until a log regarding the victim environment is received (step A11: No). Note that if the log receiving unit 14 cannot receive a log regarding the victim environment even if waited for a predetermined period of time or more, the processing is ended.

Note that, in the description of the operations of the attack reproduction support apparatus described above, the reproduction log is acquired and transmitted to the attack reproduction support apparatus 10, every time the attack information is executed, but the configuration may be such that the reproduction logs are collectively transmitted to the attack reproduction support apparatus 10 after executing all the pieces of attack information.

Figure 5:
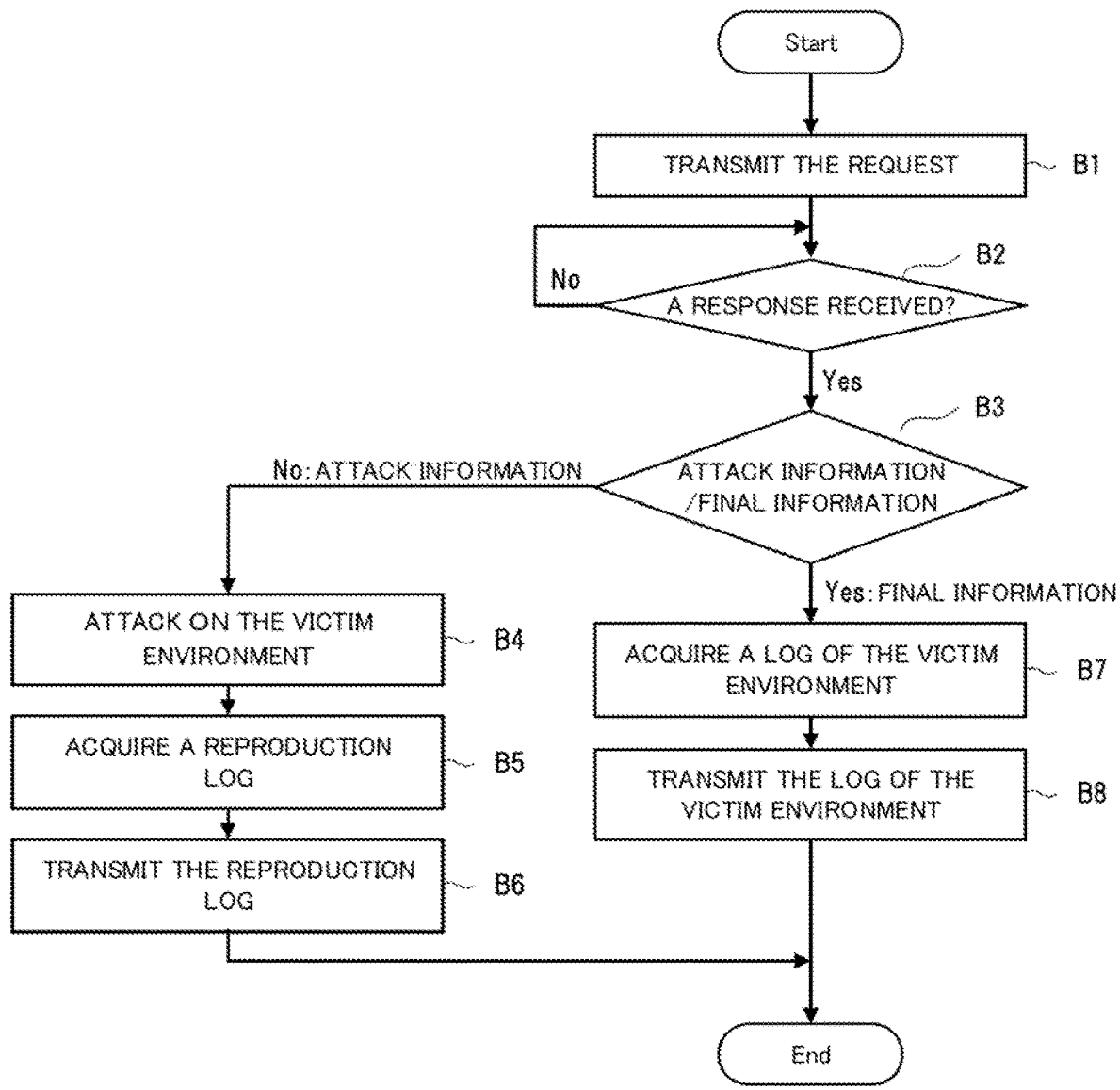
FIG. 5 is a diagram for describing an example of the operations of the attack reproduction apparatus.

Next, the operations of the attack reproduction apparatus 20 in the first example embodiment will be described using FIG. 5. FIG. 5 is a diagram for describing an example of the operations of the attack reproduction apparatus. In the following description, the drawings will be referred to as appropriate. Furthermore, in the first example embodiment, the attack reproduction method is carried out by causing the attack reproduction apparatus to operate. Therefore, the following description of the operations of the attack reproduction apparatus applies to the attack reproduction method according to the first example embodiment.

As shown in FIG. 5, first, the reproducing unit 21 transmits requests for causing the responding unit 12 to transmit attack information to the responding unit 12 at preset time intervals (step B1).

Next, the reproducing unit 21 determines whether a response from the attack reproduction apparatus 20 has been received (step B2). If a response has been received (step B2: Yes), the reproducing unit 21 determines whether or not the response is final information (step B3).

If the response is attack information (step B3: No), the reproducing unit 21 executes an attack on the victim environment based on the attack information in response to the request (step B4). Also, the reproducing unit 21 generates a reproduction log and a log regarding the victim environment.

Next, the reproduction log transmitting unit 22 acquires a log regarding the attack executed on the victim environment (step B5), the log being generated in the reproducing unit 21, and transmits the acquired log to the reproduction log receiving unit 13 (step B6).

Next, if the response is final information (step B3: Yes), the log transmitting unit 23 acquires a log regarding the victim environment that is generated in the reproducing unit 21 (step B7), and transmits the acquired log to the log receiving unit 14 (step B8).

Effects of First Example Embodiment

As described above, according to the first example embodiment, a trace of the C&C communication that is generated in an actual targeted attack, and an attack by an attacker at any timing can be reproduced, and therefore a targeted attack can be realistically reproduced. As a result, an accurate log regarding the targeted attack can be acquired.

Also, the attack timing is controlled by the attack reproduction support apparatus, and therefore a trace regarding timing control does not remain in the victim environment.

[Program]

The program for realizing the attack reproduction support apparatus in according to the first example embodiment may be a program that causes a computer to execute steps A1 to A12 shown in FIG. 4. By installing this program in a computer and executing the program, the attack reproduction support apparatus and the attack reproduction support method according to the first example embodiment can be realized. In this case, the processor of the computer performs processing to function as the setting unit 11, the responding unit 12, the reproduction log receiving unit 13, and the log receiving unit 14.

Also, the program for realizing the attack reproduction support apparatus in according to the first example embodiment may be executed by a computer system constructed by a plurality of computers. In this case, for example, each computer may function as any of the setting unit 11, the responding unit 12, the reproduction log receiving unit 13, and the log receiving unit 14.

The program for realizing the attack reproduction apparatus in according to the first example embodiment may be a program that causes a computer to execute steps B1 to B8 shown in FIG. 5. By installing this program in a computer and executing the program, the attack reproduction apparatus and the attack reproduction method according to the example embodiment can be realized. In this case, the processor of the computer performs processing to function as the reproducing unit 21, a reproduction log transmitting unit 22, and a log transmitting unit 23.

Also, the program for realizing the attack reproduction apparatus in according to the first example embodiment may be executed by a computer system constructed by a plurality of computers. In this case, for example, each computer may function as any of the reproducing unit 21, a reproduction log transmitting unit 22, and a log transmitting unit 23.

Second Example Embodiment

Figure 6:
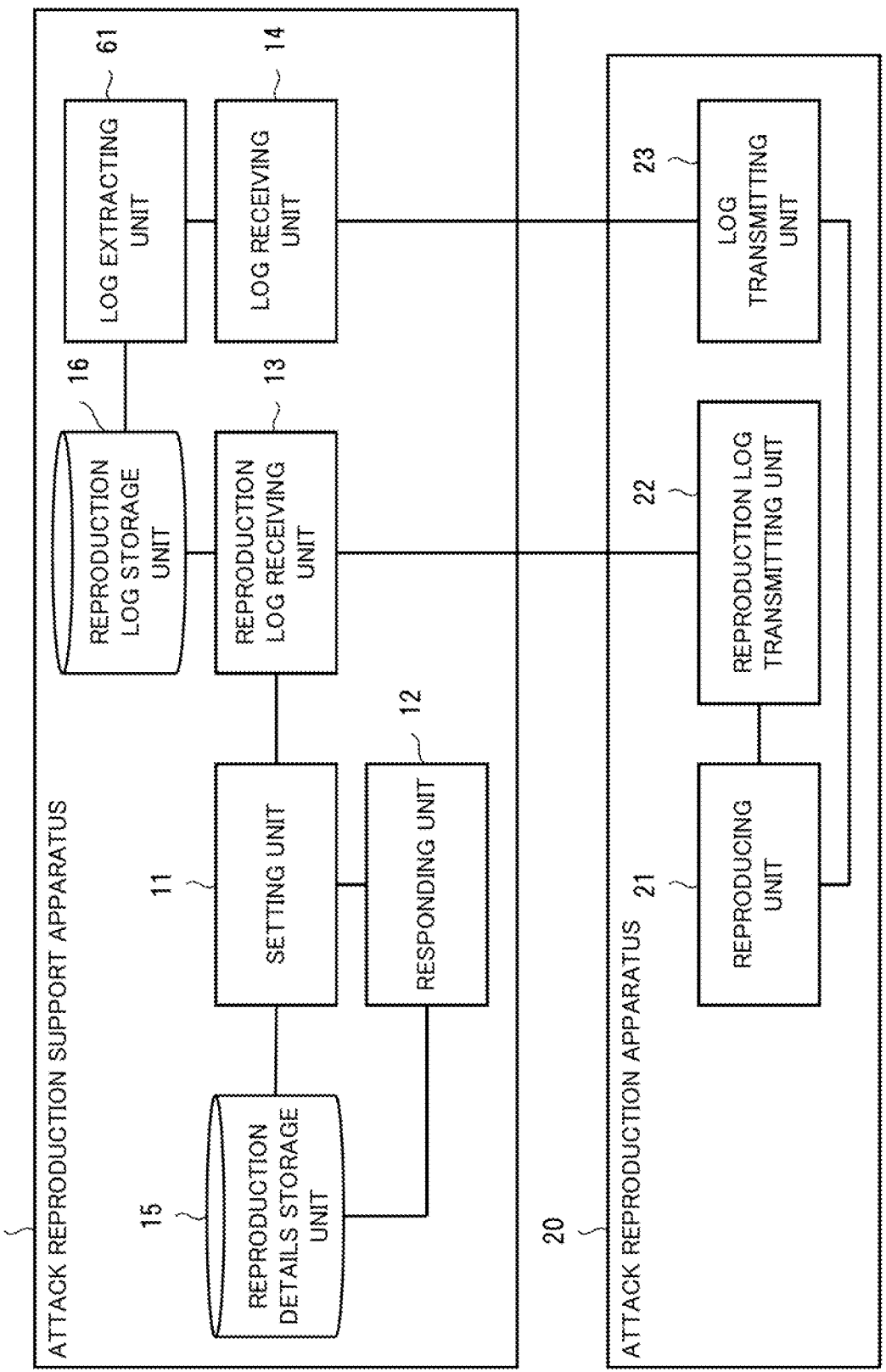
FIG. 6 is a diagram for describing an example of a system including the attack reproduction support apparatus.

The configuration of an attack reproduction support apparatus 60 according to a second example embodiment will be described using FIG. 6. FIG. 6 is a diagram for describing an example of a system including the attack reproduction support apparatus.

Apparatus Configuration

The differences between the first example embodiment and the second example embodiment will be described. The attack reproduction support apparatus 60 shown in the second example embodiment includes a log extracting unit 61 in addition to the constituent elements of the attack reproduction support apparatus 10 shown in the first example embodiment shown in FIG. 2.

The log extracting unit 61 extracts, from acquired logs regarding victim environment, logs for a period in which an attack has been executed. Specifically, the log extracting unit 61 acquires a period in which an attack has been reproduced from a reproduction log stored in a reproduction log storage unit 16, and extracts logs for the period.

Apparatus Operations

Figure 7:
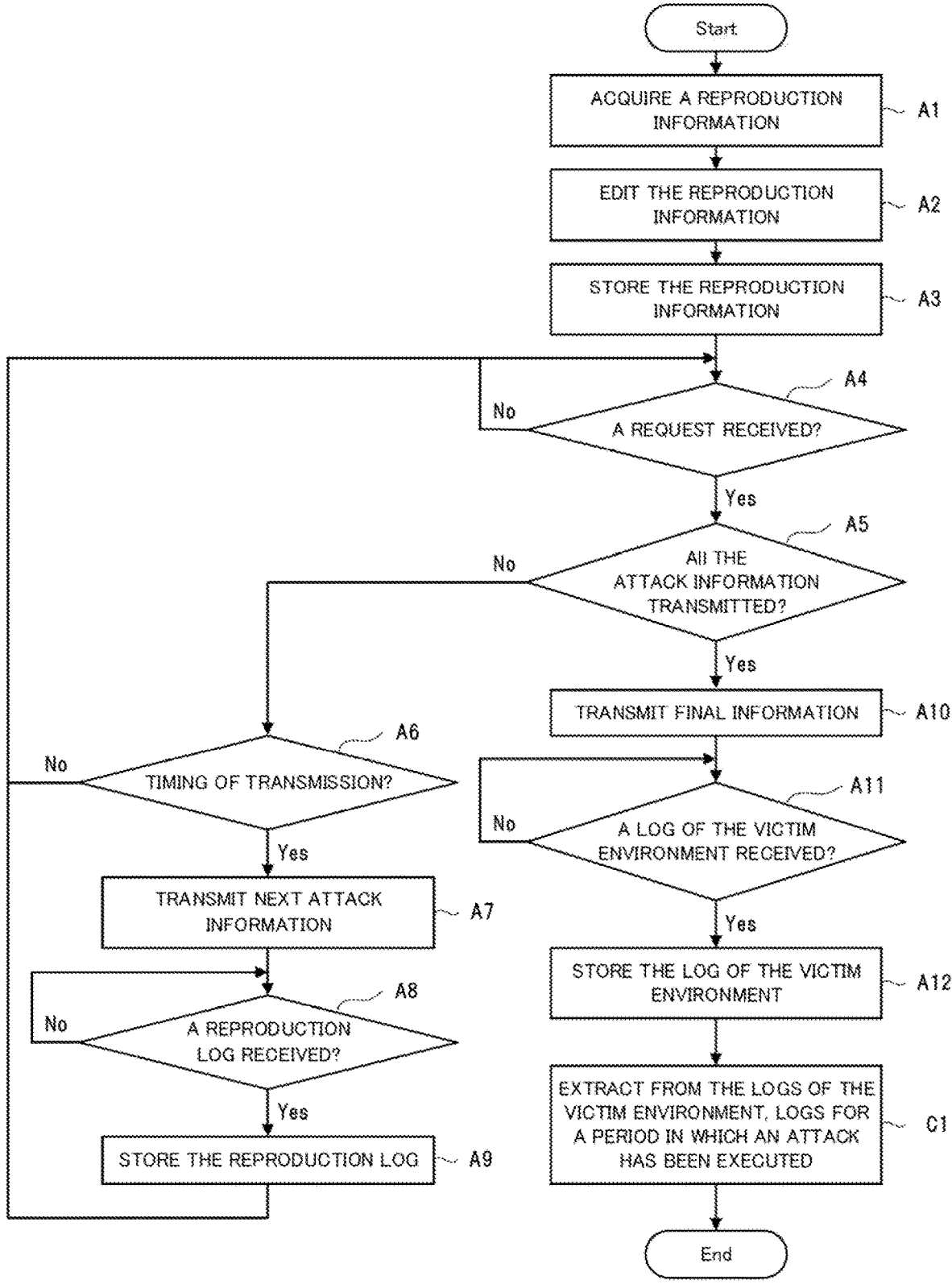
FIG. 7 is a diagram for describing an example of the operations of the attack reproduction support apparatus.

Next, the operations of the attack reproduction support apparatus 60 in the second example embodiment will be described using FIG. 7. FIG. 7 is a diagram for describing an example of the operations of the attack reproduction support apparatus. In the following description, the drawings will be referred to as appropriate. Furthermore, in the second example embodiment, the attack reproduction support method is carried out by causing the attack reproduction support apparatus to operate. Therefore, the following description of the operations of the attack reproduction support apparatus applies to the attack reproduction support method according to the second example embodiment.

The differences between the first example embodiment and the second example embodiment will be described. The processing performed in the attack reproduction support apparatus 60 shown in the second example embodiment further includes the processing in step C1 in addition to the processing performed by the attack reproduction support apparatus 10 shown in the first example embodiment shown in FIG. 4.

In step C1, the log extracting unit 61 extracts, from the acquired logs regarding the victim environment, logs for a period in which an attack has been executed. Specifically, the log extracting unit 61 acquires the period in which an attack has been executed from a reproduction log stored in the reproduction log storage unit 16, and extracts the logs for the period.

Effects of Second Example Embodiment

As described above, according to the second example embodiment, an accurate log regarding a targeted attack can be acquired from logs regarding a victim environment.

[Program]

The program for realizing the attack reproduction support apparatus in according to the second example embodiment may be a program that causes a computer to execute steps A1 to A12 and C1 shown in FIG. 7. By installing this program in a computer and executing the program, the attack reproduction support apparatus and the attack reproduction support method according to the second example embodiment can be realized. In this case, the processor of the computer performs processing to function as the setting unit 11, the responding unit 12, the reproduction log receiving unit 13, the log receiving unit 14, and the log extracting unit 61.

Also, the program for realizing the attack reproduction support apparatus in according to the first example embodiment may be executed by a computer system constructed by a plurality of computers. In this case, for example, each computer may function as any of the setting unit 11, the responding unit 12, the reproduction log receiving unit 13, the log receiving unit 14, and the log extracting unit 61.

Physical Configuration

Figure 8:
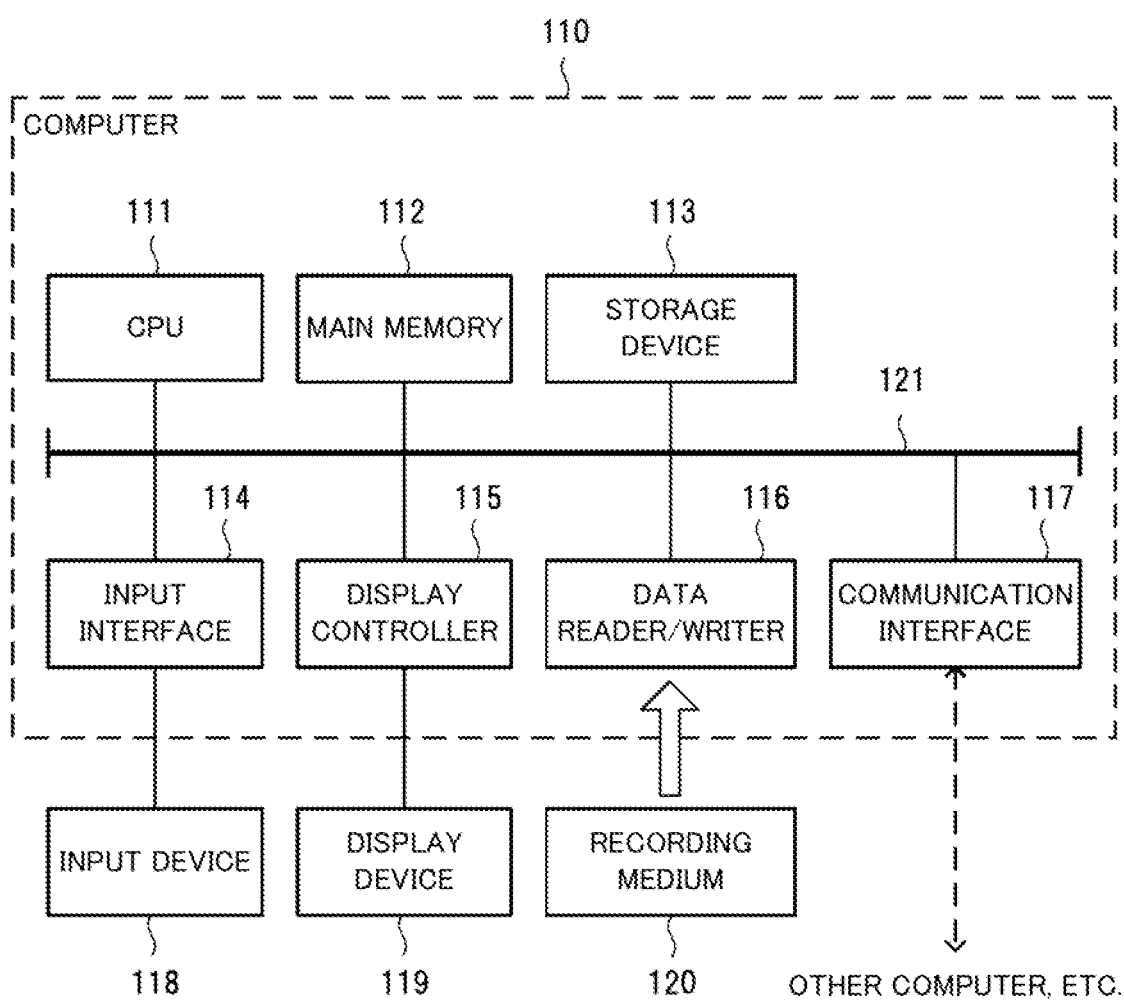
FIG. 8 is a diagram for describing an example of a computer that realizes the attack reproduction support apparatus or the attack reproduction apparatus.

Here, a computer that realizes the attack reproduction support apparatus or the attack reproduction apparatus by executing the program according to the first example embodiment and second example embodiment will be described with reference to FIG. 8. FIG. 8 is a diagram for describing an example of a computer that realizes the attack reproduction support apparatus or the attack reproduction apparatus.

As shown in FIG. 8, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 411 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the attack reproduction support apparatus or the attack reproduction apparatus according to first example embodiment and second example embodiment can also be realized by using hardware corresponding to each unit. Furthermore, a portion of the attack reproduction support apparatus or the attack reproduction apparatus may be realized by a program, and the remaining portion realized by hardware.

[Supplementary Notes]

Furthermore, the following supplementary notes are disclosed regarding the example embodiments described above. Some portion or all of the example embodiments described above can be realized according to (supplementary note 1) to (supplementary note 12) described below; but the below description does not limit.

(Supplementary Note 1)

An attack reproduction support apparatus comprising:
a setting unit configured to set a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and
a responding unit configured to, upon receiving a request for transmitting the attack information from the attack reproduction apparatus, transmitting the attack information to the attack reproduction apparatus based on the sequence information, in order to respond to the request.

(Supplementary Note 2)

The attack reproduction support apparatus according to Supplementary Note 1,
wherein the setting unit sets timing information indicating timings at which the plurality of pieces of attack information are respectively transmitted to the attack reproduction apparatus.

(Supplementary Note 3)

The attack reproduction support apparatus according to Supplementary Note 1 or 2, further comprising:
a receiving unit configured to receive history information that has been generated when the attack reproduction apparatus reproduced a targeted attack based on the attack information from the attack reproduction apparatus.

(Supplementary Note 4)

An attack reproduction support method comprising:
a setting step of setting a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and
a responding step of, transmitting, upon receiving a request for transmitting the attack information from the attack reproduction apparatus, the attack information to the attack reproduction apparatus based on the sequence information, in order to respond to the request.

(Supplementary Note 5)

The attack reproduction support method according to Supplementary Note 4,
wherein, in the setting step, timing information is set that indicates timings at which the plurality of pieces of attack information are respectively transmitted to the attack reproduction apparatus.

(Supplementary Note 6)

The attack reproduction support method according to Supplementary Note 4 or 5, further comprising:
wherein, in the receiving step, receiving history information that has been generated when the attack reproduction apparatus reproduced a targeted attack based on the attack information from the attack reproduction apparatus.

(Supplementary Note 7)

A computer-readable recording medium that includes a program including instructions recorded thereon, the instructions causing a computer to carry out:
a setting step of setting a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and
a responding step of, transmitting, upon receiving a request for transmitting the attack information from the attack reproduction apparatus, the attack information to the attack reproduction apparatus based on the sequence information, in order to respond to the request.

(Supplementary Note 8)

The computer-readable recording medium according to Supplementary Note 7,
wherein, in the setting step, timing information is set that indicates timings at which the plurality of pieces of attack information are respectively transmitted to the attack reproduction apparatus.

(Supplementary Note 9)

The computer-readable recording medium according to Supplementary Note 7 or 8, the program further including instructions that cause the computer to carry out
wherein, in the receiving step, receiving history information that has been generated when the attack reproduction apparatus reproduced a targeted attack based on the attack information from the attack reproduction apparatus.

(Supplementary Note 10)

A system including an attack reproduction support apparatus and an attack reproduction apparatus,
wherein the attack reproduction support apparatus includes:
a setting unit configured to set a plurality of pieces of attack information for causing an attack reproduction apparatus that reproduces a targeted attack to reproduce a targeted attack, and sequence information indicating a sequence of transmitting the plurality of pieces of attack information to the attack reproduction apparatus; and
a responding unit configured to, upon receiving a request for transmitting the attack information from the attack reproduction apparatus, transmitting the attack information to the attack reproduction apparatus based on the sequence information, in order to respond to the request, and
the attack reproduction apparatus includes:
a reproducing unit configured to reproduce a targeted attack based on the attack information in response to the request transmitted to the attack reproduction support apparatus; and
a transmitting unit configured to transmit history information generated when a targeted attack has been reproduced to the attack reproduction apparatus.

(Supplementary Note 11)

The system according to Supplementary Note 10,
wherein the setting unit sets timing information indicating timings at which the plurality of pieces of attack information are respectively transmitted to the attack reproduction apparatus.

(Supplementary Note 12)

The system according to Supplementary Note 10 or 11,
wherein the attack reproduction support apparatus further includes
a receiving unit configured to receive history information that has been generated when the attack reproduction apparatus reproduced a targeted attack based on the attack information from the attack reproduction apparatus.

Although the present invention of this application has been described with reference to exemplary embodiments, the present invention of this application is not limited to the above exemplary embodiments. Within the scope of the present invention of this application, various changes that can be understood by those skilled in the art can be made to the configuration and details of the present invention of this application.

INDUSTRIAL APPLICABILITY

As described above, according to the present invention, it is possible to realistically reproduced a targeted attack. The present invention is useful in fields where it is necessary to reproduce exercises, education and real-life examples.

REFERENCE SIGNS LIST

10 Attack reproduction support apparatus
11 Setting unit
12 Responding unit
13 Reproduction log receiving unit
14 Log receiving unit
15 Reproduction details storage unit
16 Reproduction log storage unit
20 Attack reproduction apparatus
21 Reproducing unit
22 Reproduction log transmitting unit
23 Log transmitting unit
60 Attack reproduction support apparatus
61 log extracting unit
100 System
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. An attack reproduction support apparatus comprising:
at least one memory storing instructions; and
at least one processor configured to execute the instructions to:
set a plurality of pieces of attack information and sequence information indicating a sequence of transmitting the plurality of pieces of attack information to an attack reproduction apparatus that executes an attack on a victim environment based on the attack information for reproducing a targeted attack, and reproduces the targeted attack; and
upon receiving a request for transmitting the attack information to the attack reproduction apparatus, transmit the attack information to the attack reproduction apparatus based on the sequence information, in order to respond to the request.

2. The attack reproduction support apparatus according to claim 1,
wherein in setting the plurality of pieces of attack information and the sequence information, timing information indicating timings at which the plurality of pieces of attack information are respectively transmitted to the attack reproduction apparatus are set.

3. The attack reproduction support apparatus according to claim 1,
wherein the at least one processor is configured to execute the instructions to further receive, from the attack reproduction apparatus, history information that has been generated when the attack reproduction apparatus reproduced the targeted attack based on the attack information.

4. An attack reproduction support method performed by a computer and comprising:
setting a plurality of pieces of attack information and sequence information indicating a sequence of transmitting the plurality of pieces of attack information to an attack reproduction apparatus that executes an attack on a victim environment based on the attack information for reproducing a targeted attack, and reproduces the targeted attack; and
upon receiving a request for transmitting the attack information to the attack reproduction apparatus, transmitting the attack information to the attack reproduction apparatus based on the sequence information, in order to respond to the request.

5. The attack reproduction support method according to claim 4,
wherein, in setting the plurality of pieces of attack information and the sequence information, timing information indicating timings at which the plurality of pieces of attack information are respectively transmitted to the attack reproduction apparatus are set.

6. The attack reproduction support method according to claim 4, further comprising:
receiving, from the attack reproduction apparatus, history information that has been generated when the attack reproduction apparatus reproduced the targeted attack based on the attack information.

7. The attack reproduction support apparatus according to claim 1,
wherein the victim environment is an environment for reproducing the targeted attack, which is realized by using at least a virtual machine and a virtual network.

8. A non-transitory computer-readable recording medium storing a program executable by a computer to perform processing comprising:
setting a plurality of pieces of attack information and sequence information indicating a sequence of transmitting the plurality of pieces of attack information to an attack reproduction apparatus that executes an attack on a victim environment based on the attack information for reproducing a targeted attack, and reproduces the targeted attack; and
upon receiving a request for transmitting the attack information to the attack reproduction apparatus, transmitting the attack information to the attack reproduction apparatus based on the sequence information, in order to respond to the request.

9. The non-transitory computer-readable recording medium according to claim 8,
wherein, in setting the plurality of pieces of attack information and the sequence information, timing information indicating timings at which the plurality of pieces of attack information are respectively transmitted to the attack reproduction apparatus are set.

10. The non-transitory computer-readable recording medium according to claim 8, wherein the processing further comprises:
receiving, from the attack reproduction apparatus, history information that has been generated when the attack reproduction apparatus reproduced the targeted attack based on the attack information.

11. A system including an attack reproduction support apparatus and an attack reproduction apparatus,
wherein the attack reproduction support apparatus comprises;
at least one memory configured to store instructions; and
at least one processor configured to execute the instructions to:
set a plurality of pieces of attack information and sequence information indicating a sequence of transmitting the plurality of pieces of attack information to an attack reproduction apparatus that executes an attack on a victim environment based on the attack information for reproducing a targeted attack, and reproduces the targeted attack; and upon receiving a request for transmitting the attack information to the attack reproduction apparatus, transmit the attack information to the attack reproduction apparatus based on the sequence information, in order to respond to the request, wherein the attack reproduction apparatus includes:

at least one memory storing instructions; and at least one processor configured to execute the instructions to:

reproduce the targeted attack based on the attack information in response to the request transmitted to the attack reproduction support apparatus; and transmit history information generated when the targeted attack has been reproduced to the attack reproduction support apparatus.

12. The system according to claim 11, wherein in setting the plurality of pieces of attack information and the sequence information, timing information indicating timings at which the plurality of pieces of attack information are respectively transmitted to the attack reproduction apparatus are set.

13. The system according to claim 11, wherein the at least one processor of the attack reproduction support apparatus is configured to execute the instructions to further receive the history information.

* * * * *